United States Patent [19]

Venable

[11] 4,288,253

[45] Sep. 8, 1981

[54] WATER INSENSITIVE BONDED PERLITE STRUCTURAL MATERIALS

[75] Inventor: Joseph M. Venable, New Braunfels, Tex.

[73] Assignee: Pamrod, Incorporated, McQueeney, Tex.

[21] Appl. No.: 46,848

[22] Filed: Jun. 8, 1979

Related U.S. Application Data

[63] Continuation of Ser. No. 502,072, Aug. 30, 1974, abandoned.

[51] Int. Cl.$^3$ .............................................. C04B 43/00
[52] U.S. Cl. ................................ 106/84; 106/DIG. 2
[58] Field of Search .................. 106/40 R, 84, DIG. 2

[56] References Cited

U.S. PATENT DOCUMENTS 3,658,564  4/1972  Gerow et al. ..................... 106/84

*Primary Examiner*—James Poer
*Attorney, Agent, or Firm*—Hubbard, Thurman, Turner, Tucker & Glaser

[57] ABSTRACT

Improved water insensitive bonded perlite structural materials are produced by combining expanded perlite with an aqueous solution of an alkali metal silicate and thereafter molding the mixture into a desired shape and curing the molded mixture under closely controlled temperature and humidity conditions. The aqueous solution of alkali metal silicate will be either a sodium silicate solution or a potassium silicate solution. The temperature and humidity conditions for curing the molded perlite and alkali metal silicate mixture are from about 180° F. to about 225° F. and from about 30% to about 60% relative humidity. By carrying out the curing process under the closely controlled temperature and relative humidity conditions, a water insoluble crystalline reaction product is formed between the alkali metal silicate and the reactive expanded perlite.

10 Claims, No Drawings

WATER INSENSITIVE BONDED PERLITE STRUCTURAL MATERIALS

This is a continuation of co-pending application Ser. No. 502,072 filed Aug. 30, 1974 now abandoned.

This invention relates to an improved water insensitive expanded perlite structural material and a method for making it. In another aspect, this invention relates to an improved water insensitive expanded perlite structural material bonded by an in situ produced water insoluble crystalline reaction product of the expanded perlite and at least one alkali metal silicate and a method for producing the improved material. In still another aspect, this invention relates to an improved water insensitive expanded perlite structural material and a method for producing it by carrying out a curing process under very closely controlled temperature and relative humidity conditions.

Lightweight structural materials are widely used in industry as building materials, thermal insulation materials and the like. Many different types of lightweight structural materials have been suggested as being suitable for building materials and thermal insulation materials. Foamed plastic materials, cork, fiberglass and other lightweight components have been used to produce such building materials and thermal insulation materials. Recently, expanded perlite has been widely used to produce structural building materials such as acoustical ceiling panels and thermal insulation products such as pipe and valve insulating covers.

Expanded perlite must be combined with a suitable binder material to render it usable as a structural material. The use of expanded perlite, held together with an inorganic binder and various reinforcing fibers to form insulation materials is relatively old in the art. However, despite the large number of patents and references dealing with the production of expanded perlite insulation materials, practically all such prior art insulation materials fail to meet several important industrial requirements. For example, industrially acceptable insulation materials must be usable at high temperatures approaching 2,000° F. without decomposition. Additionally, industrially acceptable insulation materials must have good cohesive strength at ambient temperatures to permit shipping and handling of the materials without undesirable breaking. Acceptable insulation materials must also be easily shaped and molded into different configurations, particularly in the area of pipe insulation. One very important requirement of an insulation material is that it must be water insensitive. Unfortunately, most prior art insulation compositions, wherein expanded perlite is the main filler material, do not have water resistance. Therefore, the prior art expanded perlite insulation materials must be used in those applications where they are not subjected to water. It has been found that water will cause a severe loss of strength and disintegration of most expanded perlite insulation materials because the binder is dissolved or leached out of the insulation product by the action of water.

Various attempts have been described in the prior art to overcome the sensitivity of expanded perlite structures to water damage. For example, U.S. Pat. No. 3,658,564 discloses a process for producing expanded perlite structures by using a sodium silicate or potassium silicate binder with expanded reactive perlite. According to the teachings of U.S. Pat. No. 3,658,564, the expanded reactive perlite could be mixed with the alkali metal silicate and the mixture could thereafter be molded and cured under temperature and humidity conditions whereby the water content of the molded article was maintained at a level of above 10 weight percent. The curing temperature was disclosed as being above 275° F. While the products produced in accordance with the teaching of that patent did exhibit some improved properties, the insulation materials still had several very serious deficiencies. For example, the insulation materials produced in accordance with the teaching of that patent generally had surface cracks or they exhibited severe warping when subjected to high temperatures. The surface cracks observed in the products of the above-mentioned United States patent resulted in catastrophic decomposition of the molded insulation materials when they were applied to vibrating equipment such as pumps, high pressure steam lines and the like.

It is therefore an object of this invention to provide an improved water insensitive expanded perlite structural material and a method for producing it.

Another object of this invention is to provide an improved expanded perlite structural material that is bonded together by an in situ produced water insoluble crystalline reaction product of the expanded perlite and at least one alkali metal silicate and a method for producing such improved structural material.

Another object of this invention is to provide an improved expanded perlite structural material that is water insensitive and is free of cracks and other structural weaknesses and a method for producing it by carrying out a curing step under very closely controlled temperature and humidity conditions.

Other objects, advantages and features of this invention will be apparent to those skilled in the art from the following disclosure.

The improved water insensitive structural materials of the present invention are produced by mixing a filler material having at least 75 parts by weight of reactive expanded perlite with an aqueous solution of at least one alkali metal silicate. In the mixing step, from about 1 to about 2 parts by weight of the filler material are combined with from about 4 to about 1 parts by weight of an aqueous solution of the alkali metal silicate. When the alkali metal silicate is sodium silicate, the weight ratio of $SiO_2$ to $Na_2O$ is from about 3:1 to about 4:1 and the solids content is from about 28 to about 34 weight percent. When the alkali metal silicate is potassium silicate, the weight ratio of $SiO_2$ to $K_2O$ is from about 2:1 to about 2.6:1 and the solids content is from about 24 to about 30 weight percent. After the filler material has been thoroughly combined and mixed with the aqueous solution of the alkali metal silicate, the mixture is formed together in a coherent mass by compressing. The coherent mass is then cured under closely controlled curing conditions at a temperature of about 180° F. to about 225° F. and at a relative humidity of about 30% to about 60%.

The filler component of the improved products and process of this invention must contain at least 75 weight percent of an expanded reactive perlite. The reactive expanded perlite is formed by heating perlite ore, which is an expansible volcanic glass material consisting essentially of silica, aluminum silicate of varying degrees of hydration and small amounts of various other materials such as alkalis and the like. The perlite is expanded by heating the volcanic glass to temperatures exceeding 1,550° F. Processes for expanding perlite to provide a low density expanded reactive perlite are disclosed in U.S. Pat. Nos. 2,455,666; 2,501,699; 2,621,160 and are otherwise generally known in the art. The expanded perlite will have a density of from about 2 to 8 pounds per cubic feet as compared to about 140 pounds per cubic foot for the unexpanded perlite ore. The preferred expanded perlite materials used in this invention usually have a density of from about 2.5 to about 3 pounds per cubic foot. Reactive expanded perlite used in the instant invention has the following typical analysis:

| Oxide | | % by Weight |
|---|---|---|
| Silicon Dioxide | ($SiO_2$) | 71.0–75.0 |
| Aluminum Oxide | ($Al_2O_3$) | 12.5–18.0 |
| Potassium Oxide | ($K_2O$) | 4.0–5.0 |
| Sodium Oxide | ($Na_2O$) | 2.9–4.0 |
| Calcium Oxide | (CaO) | 0.5–2.0 |
| Ferric Oxide | ($Fe_2O_3$) | 0.5–1.5 |
| Magnesium Oxide | (MgO) | 0.1–0.5 |
| Titanium Dioxide | ($TiO_2$) | 0.03–0.2 |

The physical properties of expanded perlite fillers used in the instant invention are typically as follows:

| | |
|---|---|
| Color | White |
| Softening point | 1,600°–2,000° F. |
| Fusion point | 2,300°–2,450° F. |
| pH | 6.6 to 8.0 |
| Specific heat | 0.20 |
| Specific gravity | 2.2 to 2.4 |
| Refractive index | 1.5 |
| % Free moisture, maximum | 0.5 |
| Loose weight, pcf | As desired |
| Solubility | Soluble in hot concentrated alkali and in hydrofluoric acid. Slighty soluble (2%) in concentrated mineral acids Very slightly soluble (0.1%) in dilute mineral or concentrated weak acids. |

Most perlites that are processed and expanded in this country are obtained from a common geographical area and are chemically similar.

The expanded perlite material that makes up at least 75% by weight of the filler material used in this invention is referred to generally as a "reactive perlite." While applicant does not desire to be bound by any particular scientific theory, it is believed the perlite reacts with the aqueous alkali metal silicate to form a water insoluble crystalline material in the cured article. Therefore, the expanded perlite is referred to as "reactive perlite."

In addition to the above-mentioned reactive expanded perlite material that makes up at least 75 weight percent of the filler material, various other inert ingredients may be included in the filler. These inert fillers can be added to extend the expanded perlite or to modify or affect the ultimate properties of the insulation material produced in accordance with this invention. For example, various fiber type materials can be added to the filler mixture to reinforce and add strength to the cured product. Such fibrous fillers can include synthetic fibers such as nylon, polypropylene, polyester materials, rayon and the like. Additionally, metal whiskers or chopped meshed materials, aluminosilicate fibers, rock wool and the like can be added as fibrous fillers. One of the most preferred fibrous fillers for reinforcing the cured product is chopped sisal fiber. The length of any of the foregoing fibrous materials can be any convenient length so long as the mixing and molding characteristics of the uncured composition of this invention are not adversely affected. When fibrous fillers are added to the composition, they are usually added in amounts of up to 5 weight percent of the filler material, although higher percentages may be desirable in some instances. Usually the average length of the reinforcing fibers will be from about ⅛ inch to about ½ inch. In addition to the foregoing fibrous type materials, other inert fillers may be added including various particulate materials such as clays, gypsum, flyash, wollastonite, vermiculite, carbon black, pigments and the like.

Aqueous alkaline ionic silicates are utilized as the binder materials for producing the improved water resistant insulation products of this invention. The aqueous alkaline ionic silicates used in this invention are water soluble compounds which are substantially completely ionized in the aqueous solution. Either sodium silicate solutions or potassium silicate solutions are used as the binder component of this invention. In some instances, it may be desirable to use a mixture of these two silicate materials as the binder component. When sodium silicate is used as the binder material the preferred weight ratio of $SiO_2$ to $Na_2O$ in the aqueous solution ranges from about 3:1 to about 4:1 and the solids content of the solution in the range of about 28 to about 34 weight percent.

It has been found that weight ratios of the $SiO_2$ to $NaO_2$ below about 3:1 do not produce water insensitive structural materials by this invention. While ratios of above 4:1 for the $SiO_2$ to $Na_2O$ can be utilized, no particular beneficial effect is noted and such materials become quite expensive. Therefore, from a standpoint of economics, the preferred ratio is lower than about 4:1.

Various commercial aqueous solutions of sodium silicate are available and it has been found that an aqueous sodium silicate solution having a weight ratio of $SiO_2$ to $Na_2O$ of 3.25:1 is one of the most preferred silicate binders. When using commercial aqueous solutions of alkali metal silicates, it may be necessary to add water to obtain the proper solids content of the solution that is used in this invention.

When a potassium silicate solution is utilized as the binder component, the preferred weight ratio of $SiO_2$ to $K_2O$ in the aqueous solution ranges from about 2:1 to 2.6:1. The solids content of the potassium silicate solution is in the range of about 24 to about 30 weight percent. The filler materials and the aqueous solution of the alkali metal silicate can be mixed by any convenient means known in the art. It is important, however, that the two components be thoroughly mixed together in such a manner that the filler material is completely wetted with the aqueous solution of the alkali metal silicate. Without the complete wetting of the filler material, the ultimately cured insulation product will have unacceptable physical properties.

In commercial operations, large rotating drum type mixers are satisfactory for the mixing step. A rotating drum with a counter rotating whip is quite acceptable for mixing the filler material with the aqueous solution of the alkali metal silicate in commercial operations. On smaller batches, mixers such as a Hobart mixer with a wire whip beater can be utilized. In those operations where fibrous reinforcing fillers are utilized, as for example in the utilization of sisal fibers and the like, other types of mixing apparatus may be utilized including pug mills, kneader-type mixers and the like.

The mixing step is carried out by mixing from 1 to 2 parts by weight of the above-described filler material with from 4 to 1 parts by weight of the above-described aqueous silicate solution. It should be understood that while the foregoing disclosure has been directed to a discussion of the two essential components of the improved structural material, other components may also be used. Thus, while the improved water insensitive structural materials of this invention consist essentially of the reactive expanded perlite bonded by the in situ produced water insoluble crystalline reaction product of the expanded perlite and at least one alkali metal silicate, other optional materials may be incorporated in the recipe.

Such other optional components may include water-repelling agents such as siloxane-type components to render the cured product water-repellent. It has been found particularly advantageous to incorporate such polysiloxane-type materials to render the cured product water-repellent because the cured products are quite often subjected to rain and dampness as they are stored and applied to various vessels and pipes in the field. While the water does not reduce the strength of the cured products, it does add to the weight of the cured insulation products and makes the installation of them quite difficult. More importantly, when insulation materials are water-soaked, their insulating properties are greatly impaired and the "K" factor increases drastically. Also, when water-soaked thermal insulation materials are applied to surfaces that are later subjected to high temperatures, such as on superheated steam lines, or on the surfaces of refinery and chemical plant reactors and the like, a sudden increase in the temperature of the insulation material will cause the water that is trapped within the mass of the insulation material to heat up rapidly, form steam and perhaps blow out large portions of the insulation material. Therefore, the incorporation of the polysiloxane materials in the recipe will render the cured insulation materials water-repellent and will prevent the insulation materials from absorbing water under field conditions.

When polysiloxane materials are added to the recipe utilized to make the improved structural materials of this invention, they are usually added at the time the filler is mixed with the aqueous solution of the alkali metal silicates. Other known water-repelling components may also be added to the recipe to render the cured insulation materials water-repellent. The amounts of the water-repelling materials such as the polysiloxanes can be adjusted to produce the desired water-repellent effect in the cured product, but in most cases the addition of the water-repelling materials will be in an amount of less than 3% by weight of the filler material.

It will be apparent to those skilled in the art that other components may be added to the recipe during the mixing step if desired. These other components can include salts and the like to increase resistance to stress corrosion of metal substrates of alloy materials when they are subjected to high temperature operations. However, the compositions of this invention do not require the addition of such salts to increase resistance to stress corrosion because they will pass the "Dana Test" which is one of the most rigid tests for stress corrosion of alloy materials such as stainless steel, without any additional additives.

Following the mixing of the filler materials and the aqueous solution of the alkali metal silicate, as well as other optional components, the thoroughly wetted filler materials can be formed into any desired shape. Usually, the mixture is pressed into a coherent mass by the application of pressure. Ceramic processing operations using molds and various pressing techniques are most often used to form the desired shapes. Such molding operations are almost always used when insulation products such as pipe insulation components are manufactured.

In forming the coherent mass that is to be cured in accordance with this invention, care must be exercised in not applying excess pressure to the wetted filler material. It has been found that pressures of above about 250 pounds per square inch will result in a crushing or collapsing of the expanded perlite structure and such elevated pressures will cause the aqueous solution of the alkali metal silicate to be squeezed from the molded article, resulting in unacceptable physical strength of the molded article. Therefore, it has been found desirable to use compaction pressures of from about 30 to about 150 pounds per square inch for forming the molded articles that are cured in accordance with this invention.

Because of the workability of the mixture of the filler materials with the aqueous solution of the alkali metal silicates, it is possible to mold and shape many different types and shapes of articles that can be cured to produce water insensitive insulation materials. By carrying out the curing process as described herein, extremely large and intricately shaped structures can be produced.

Following the shaping of the wetted filler component into the desired coherent shape, the molded shape is subjected to the very closely controlled curing process. It must be emphasized that for maximum strength and for maximum water insensitivity of the cured product, the molded "green" shape should be subjected to the closely controlled curing step as soon as possible. Thus, the "green" molded articles should not be allowed to "dry out" or otherwise lose moisture prior to the curing step.

While the prior art disclosed various methods for curing expanded perlite structures, it has been found that there is a criticality in the temperature and relative humidity conditions under which the products are cured to ensure maximum water insensitivity, strength and produce products with minimum surface and structural defects. It has been found that by curing the above-described molded mixture of the filler material with the aqueous solution of the alkali metal silicate at a temperature of from about 180° F. to about 225° F. and at a relative humidity of from about 30% to about 60%, cured products having superior properties can be produced. The more preferred curing conditions of this invention are in the range of about 180° F. to about 225° F. and a relative humidity of about 35% to about 55%.

The curing step can be carried out in any type of apparatus known in the art. Normally, the curing apparatus will be a closed or semi-closed container or zone wherein the temperature and relative humidity can be closely controlled. In many instances, it will be necessary to equip the curing zone or chamber with means for introducing water vapor to ensure the proper control of the relative humidity during the curing step. The addition of saturated steam to the curing container of zone may be particularly advantageous in controlling the relative humidity at the desired curing temperature. Steam has also been observed to catalyze the formation of the water insoluble crystalline structure in the cured articles.

The most preferred method of curing used in the present invention is one in which open flames, such as natural gas, supply the necessary heat to the curing apparatus. By using the open flame technique, the products of combustion can be circulated around the articles being cured and the rate of cure is increased. Thus it is preferred to circulate hot flue gases from open flames in the curing apparatus as the molded articles are cured.

The prior art suggestions of curing the green expanded perlite compositions at temperatures of above 275° F. or by subjecting the green molded products to long periods of curing at temperatures below 150° F. produce products that either will fail the boiling water test, as hereinafter described, or they will produce products having large numbers of visible surface cracks or they will result in materials that are severely warped. These products are, of course, unacceptable for many commercial uses.

The molded green articles are cured for a sufficient length of time to produce an article that is capable of withstanding eight hours of immersion in boiling water. Up to a certain point, the length of time for curing the green molded articles is dependent upon the thickness of the articles. When curing relatively small articles, it has been found that curing appears to take place from the surface of the article inwardly at a rate of about 1/16 inch per hour. Thus, for relatively small articles, to obtain maximum curing to a depth of 1 inch, would require subjecting the article to the above-mentioned temperature and humidity conditions for about sixteen hours. One method for determining the degree of curing is by a microscopic inspection of the article under a petrographic microscope, having a polarized light source, wherein birefringent crystalline growth is observed. There are other methods for detecting the crystalline growth such as by the application of certain dye materials. Thus, as used throughout this specification, "curing" is a term to indicate the in situ formation of birefringent crystals in the molded articles.

It will, of course, be understood that the curing will take place from the surface of the article and that an article will cure from both sides. Thus, the 2 inch thick article could be completely cured within sixteen hours because curing is taking place from both sides of the article and is curing toward the center at the rate of 1/16 inch per hour. One unexplained phenomena has been observed in carrying out the curing process of this invention wherein it has been found that curing takes place at a relatively uniform rate of about 1/16 inch per hour up to a depth of about 2 inches in large articles. However, when curing articles to a depth of over 2 inches (articles having over 4 inch thickness), the depth of cure versus time becomes non-linear.

Contrary to what has been reported in the prior art, it has been found that the curing process of the instant invention can be essentially complete within a given period of time and that continued curing or aging of the molded products for longer periods of time results in no appreciable improvement in the physical properties of the cured item. Thus, a block of insulation material can be essentially completely cured to a depth of 2 inches in about 32 hours and continued curing will not appreciably improve the physical properties of the article.

In order for the cured article to be acceptable for industrial use, the cured article must have a relatively low density and must have good thermal insulating properties. It has been found that density of the cured products of this invention will be below 25 pounds per cubic foot. The density of course is dependent upon the density of the starting materials and the amount of compaction that the wetted filler mixture underwent during the molding and shaping stages. It is possible to produce finished cured products in accordance with this invention having densities as low as about 9 pounds per cubic foot and that such low density products exhibit good water insensitivity and have good physical strength without the formation of cracks and other defects common with low density products of the prior art. Normally, the products of this invention will have a density of about 13 pounds per cubic foot.

The water resistance or water insensitivity of the cured products of this invention can be determined by a relatively severe test known as the "boiling water test." In such a test, cured samples are cut into the desired specimen sizes and are weighed and their dry densities are calculated. The cut samples are then completely submerged in water and the container with the samples submerged in the water is gradually heated until the water boils. The water is boiled for an eight hour period while the samples are completely submerged in the boiling water. Following the eight hour boiling period, the specimens are left submerged in the water for an additional 16 hour period, while the water cools to ambient conditions.

At the end of the 24 hour period of immersion in water, the samples are removed and are oven dried overnight at a temperature of 165° F. Following the overnight drying period, the dried samples are again weighed and their dry densities determined. The weight loss of the samples is then calculated and is reported as a percent based on the original dry weight of the samples.

In addition to the above-described boiling water test, the cured products of this invention must have good compressive strength. The compressive strength of the cured sample is determined by measuring the compressive strength of the sample after the boiling water test. The compressive strength is determined on an Instron testing machine. In the following examples, the compressive strength is reported at a 5% deformation of the sample and is reported in pounds per square inch.

The following examples are included to illustrate this invention. It is to be understood that the examples are for the purpose of illustrating preferred embodiments and should not be interpreted as unduly limiting the invention.

To illustrate the critical temperature and relative humidity curing conditions used to produce the improved products of this invention, the following series of runs was conducted wherein 200 parts by weight of Dupont No. 9 grade sodium silicate solution was added to 40 parts by weight of water to produce an aqueous solution of sodium silicate having a solid content of 31.6 weight percent. The weight ratio of $SiO_2$ to $Na_2O$ was 3.25:1. This aqueous solution of sodium silicate was then mixed with 160 parts by weight expanded perlite, having a density of 2.5 pounds per cubic foot in a Hobart mixer kettle using a wire whip beater. Following the complete wetting of the expanded perlite with the aqueous solution of sodium silicate, the damp granular mixture was then pressed into molds to produce a molded half section of a pipe covering insulation material. Unless otherwise indicated, the pipe cover insulation material had an internal diameter of 3 inches and was 2 inches thick. At least 6 individual sections of the pipe covering material were cured for 24 hours by maintaining them at the temperature and the relative humidity indicated in each of the runs below. Following the 24 hour curing period, the individual samples were allowed to cool and they were inspected for warping and the presence of surface cracks. The samples were then subjected to the above-described boiling test. In order for a sample to pass the boiling water test, the weight loss had to be less than 2 weight percent. The values reported for compressive strength in the following table are values determined on an Instron testing machine at 5% deformation of the samples following the boiling water test. If a sample passed the boiling water test, it was usually subjected to an additional test to determine if it was commercially acceptable by subjecting the sample to an elevated temperature test at 500° F. for 4 hours. Following this elevated temperature test, the samples were examined to determine if they exhibited additional warping or if they exhibited additional cracking during the elevated temperature test. If warping or additional cracking was observed, the samples were indicated as failing the test.

The following table summarizes the results of this series of runs. In the following table, the values reported are the average of at least 6 samples in each individual run:

It will be understood to those skilled in the art that various modifications may be made in the recipes and procedures set forth above without departing from the spirit and scope of this invention.

What is claimed is:

1. An improved water insensitive structural material consisting essentially of reactive expanded perlite bonded by an in situ produced water insoluble, crystalline reaction product of said expanded perlite and at least one alkali metal silicate selected from sodium silicate and potassium silicate, said structural material being made by a process comprising the steps of:
   (a) mixing from about 1 to about 2 parts by weight of a filler material having at least 75 parts by weight reactive expanded perlite with about 4 to about 1 parts by weight of an aqueous solution of said at least one alkali metal silicate and when said alkali metal silicate is sodium silicate, the weight ratio of $SiO_2$ to $Na_2O$ is from about 3:1 to about 4:1 and the solids content is from about 28 to about 34 weight percent and when said alkali metal silicate is potassium silicate, the weight ratio of $SiO_2$ to $K_2O$ is from about 2:1 to about 2.6:1 and the solids content is from about 24 to about 30 weight percent;

| Run Number | Cure Temp. (°F.) | Cure RH (%) | Warp (inches) | Surface Cracks | Boiling Water Test (Pass or Fail) | Compressive Strength psi | 4 Hours at 500° F. (Pass or Fail) |
|---|---|---|---|---|---|---|---|
| 1 | 160 | 35 | 0 | 0 | F | — | — |
| 2 | 170 | 20 | 3/32 | Severe | F | — | — |
| 3 | 170 | 30 | 0 | 0 | F | — | — |
| 4 | 170 | 40 | 0 | 0 | F | — | — |
| 5 | 170 | 50 | 0 | 0 | F | — | — |
| 6 | 170 | 60 | 0 | 0 | F | — | — |
| 7 | 180 | 20 | 3/32 | Slight | F | — | — |
| 8 | 180 | 30 | 0 | 0 | P | 76 | P |
| 9 | 180 | 40 | 0 | 0 | P | 78 | P |
| 10 | 180 | 49 | 0 | 0 | P | 76 | P |
| 11 | 180 | 50 | 0 | 0 | P | 77 | P |
| 12 | 180 | 60 | 0 | 0 | P | — | P |
| 13 | 190 | 20 | ⅛ | Slight | F | — | — |
| 14 | 190 | 30 | 0 | 0 | P | 77 | P |
| 15 | 190 | 38 | 0 | 0 | P | 76 | P |
| 16* | 190 | 40 | 0 | 0 | P | 78 | P |
| 17 | 190 | 50 | 0 | 0 | P | 79 | P |
| 18 | 190 | 60 | 0 | 0 | P | 77 | (Very slight Surface cracks) |
| 19 | 200 | 20 | 0 | hairline | P | 74 | F |
| 20 | 200 | 25 | 0 | 0 | P | 76 | hairline cracks |
| 21 | 200 | 30 | 0 | 0 | P | 77 | P |
| 22 | 200 | 35 | 0 | 0 | P | 78 | P |
| 23 | 200 | 40 | 0 | 0 | P | 78 | P |
| 24 | 200 | 50 | 0 | 0 | P | — | P |
| 25 | 200 | 55 | 0 | 0 | P | 76 | P |
| 26 | 200 | 60 | 0 | 0 | P (very slight decomposition) | 76 | P |
| 27 | 210 | 20 | ⅛ | Severe | F | — | — |
| 28 | 210 | 30 | 1/32 | Very Slight | P | 76 | P |
| 29 | 210 | 40 | 0 | 0 | P | 77 | P |
| 30 | 210 | 50 | 0 | 0 | P | 78 | P |
| 31 | 210 | 60 | 0 | Very Slight | P | 70 | — |
| 32 | 220 | 30 | ⅛ | Severe | F | — | — |
| 33 | 220 | 40 | 0 | 0 | P | 78 | P |
| 34 | 220 | 42 | 0 | 0 | P | 77 | P |
| 35 | 220 | 50 | 0 | 0 | P | 77 | P |
| 36 | 220 | 60 | 0 | 0 | P | 77 | Very Slight Cracks |
| 37 | 230 | 20 | ⅛ | Severe | F | — | — |
| 38 | 230 | 30 | ⅛ | Severe | F | — | — |
| 39 | 230 | 35 | ⅛ | Severe | F | — | — |
| 40 | 240 | 29 | 5/16 | Severe | F | — | — |
| 41 | 250 | 25 | ⅜ | Severe | F | — | — |
| 42 | 260 | 20 | 7/16 | Severe | F | — | — |

*Runs conducted with 2" thick pipe covers having 6" inside diameter.

(b) thereafter compressing the mixture from step (a) into a coherent article; and (c) thereafter subjecting the coherent article from step (b) to a one-stage curing process in which the article is maintained through the entire curing process at a temperature about 180° F. to about 225° F. at a relative humidity of from about 30% to 60%.

2. The structural material of claim 1 wherein said material is produced by curing the coherent article from step (b) at a temperature of from about 180° F. to about 225° F. at a relative humidity of from about 35% to about 55%.

3. The structural material of claim 1 wherein said aqueous solution of alkali metal silicate is an aqueous solution of sodium silicate having a solids content of about 31.6 weight percent and a weight ratio of $SiO_2$ to $Na_2O$ of about 3.25:1.

4. A process for preparing a water-insensitive structural material having expanded perlite bonded by an in situ produced water insoluble, crystalline reaction product of said expanded perlite and at least one alkali metal silicate selected from sodium silicate and potassium silicate, comprising the steps of:

(a) mixing from about 1 to about 2 parts by weight of a filler material having at least 75 parts by weight reactive expanded perlite with about 4 to about 1 parts by weight of an aqueous solution of said at least one alkali metal silicate and when said alkali metal silicate is sodium silicate, the weight ratio of $SiO_2$ to $Na_2O$ is about from 3:1 to about 4:1 and the solids content is from about 28 to about 34 weight percent and when said alkali metal silicate is potassium silicate, the weight ratio of $SiO_2$ to $K_2O$ is from about 2:1 to about 2.6:1 and the solids content is from about 24 to about 30 weight percent;

(b) thereafter compressing the mixture from step (a) into a coherent article; and (c) thereafter subjecting the coherent article from step (b) to a one-stage curing process in which the article is maintained through the entire curing process at a temperature about 180° F. to about 225° F. at a relative humidity of from about 30% to 60%.

5. The process of claim 4 wherein said curing is at a temperature of from about 180° F. to about 225° F. at a relative humidity of from about 35% to about 55%.

6. The process of claim 4 wherein said aqueous solution of alkali metal silicate is an aqueous solution of sodium silicate having a solids content of about 31.6 weight percent and a weight ratio of $SiO_2$ to $Na_2O$ of about 3.25:1.

7. The process of claim 4 wherein said curing is carried out for a period of time sufficient to produce a product capable of withstanding eight hours of immersion in boiling water and than be capable of withstanding exposure to 500° F. for at least four hours without disintegration.

8. The water insensitive structural material of claim 1 wherein said curing is carried out in a curing zone with products of combustion from open flames contacting said coherent article during the curing step.

9. The process of claim 4 wherein said curing is carried out in a curing zone with products of combustion from open flames contacting said coherent article during the curing step.

10. The structural material of claim 1 wherein such structural material is capable of withstanding eight hours of immersion in boiling water and then is capable of withstanding exposure to 500° F. for at least four hours without disintegration.

* * * * *